Oct. 8, 1968  R. H. HOSKINS  3,405,045

METHOD FOR INDUCING CHEMICAL REACTIONS WITH LASERS

Filed Jan. 11, 1965

INVENTOR.
RAYMOND H. HOSKINS
BY
Elliott & Pastoriza
ATTORNEYS

United States Patent Office 3,405,045
Patented Oct. 8, 1968

3,405,045
METHOD FOR INDUCING CHEMICAL
REACTIONS WITH LASERS
Raymond H. Hoskins, San Pedro, Calif., assignor to
Union Carbide Corporation, a corporation of New
York
Filed Jan. 11, 1965, Ser. No. 424,709
2 Claims. (Cl. 204—159.11)

ABSTRACT OF THE DISCLOSURE

A method and apparatus for effecting photodissociation in a photo-sensitive chemical to provide free radicals by irradiating the chemical with coherent radiation from a laser system. The radiation is modified in wavelength to a value for which the photo-sensitive chemical has a large absorption cross section. The impingement of the laser radiation results in a direct separation of molecules into free radicals.

This invention relates generally to a novel method and apparatus for inducing chemical reactions and more particularly, to a method and apparatus for effecting photosynthesis of various chemicals by means of laser generated light.

Photosynthesis by dissociation of a photo-sensitive chemical to produce free radicals and thus initiate polymerization is known in the art. The dissociation of chemical molecules in a monomer solution to provide the polymer chain generating radicals may be effected by various chemical initiators placed in the solution, thermal means, or photo-dissociation processes such as irradiation of the solution by ultraviolet light. In a vinyl solution, for example, the generation of a large number of free radicals to initiate polymer chains turns the solution into a solid bulk or bulk plastic material.

The present invention has as its primary object the provision of an improved method and apparatus enabling substantially simultaneous initiation of a large number of polymer chains in a chemical solution in a very short period of time compared with prior methods and apparatuses to the end that the photosynthesis of various chemicals may be greatly accelerated.

Another object of this invention is to provide a novel method and apparatus for enabling the initiation of photosynthesis to take place at a relatively large distance from the initiating structure so that various chemicals in which photosynthesis is to take place may be physically isolated or spaced at a desired distance from the equipment employed to initiate the operation.

Another important object is to provide an improved method and apparatus for effecting photosynthesis which may be very carefully controlled so that given areas or points may be selected at which initiation of polymerization is to take place. Realization of this object enables compound plastic products to be generated in a "laminated" or "bonded" form.

Still other objects of this invention are to provide novel methods and apparatuses for effecting photosynthesis of various chemicals wherein the initiating process may be carefully controlled to permit an accurate determination of various rate constants involved in the individual steps of radical chain reaction, as well as various other investigations relating to radical induced reactions in which high concentrations of radicals are needed.

Briefly, these and many other objects and advantages of this invention are attained by photo-dissociation of the chemical substance being treated through the use of laser generated light.

In accordance with the method of the invention, a coherent beam of radiation of given wave length is generated by means of a giant pulse laser system. This beam is then passed through a non-linear dielectric medium to provide an output coherent beam of radiation of a modified wave length for which the chemical material has a high absorption cross-section. The output beam is directed and focussed on the chemical to produce a large number of free radicals substantially simultaneously and thereby initiate polymerization of the chemical. The use of a giant pulse laser system enables the generation of extremely high peak powers so that a very high concentration of free radicals in a very short time is provided.

A preferred apparatus of the invention includes various components making up a giant pulse laser system preferably incorporating a passive Q-spoiler in the optical cavity of the laser to enable the generation of the desired high peak power pulses. The laser beam is passed through a suitable frequency doubler such as a potassium dihydrogenphosphate crystal to convert the laser light into ultraviolet light corresponding to one-half the wave length of the initially generated beam. A suitable filter for removing any radiation of wave length corresponding to that of the initially generated light is included in the apparatus so that only the doubled frequency output beam irradiates the chemical substance under investigation.

Because of the directivity and focussing characteristics of the laser derived output beam, the particular chemical under investigation may be disposed at a site remote from the laser system itself and the beam directed towards the site.

A better understanding of the method and apparatus of this invention will be had by now referring to a specific example thereof as illustrated in the accompanying drawings, in which.

Figure 1:
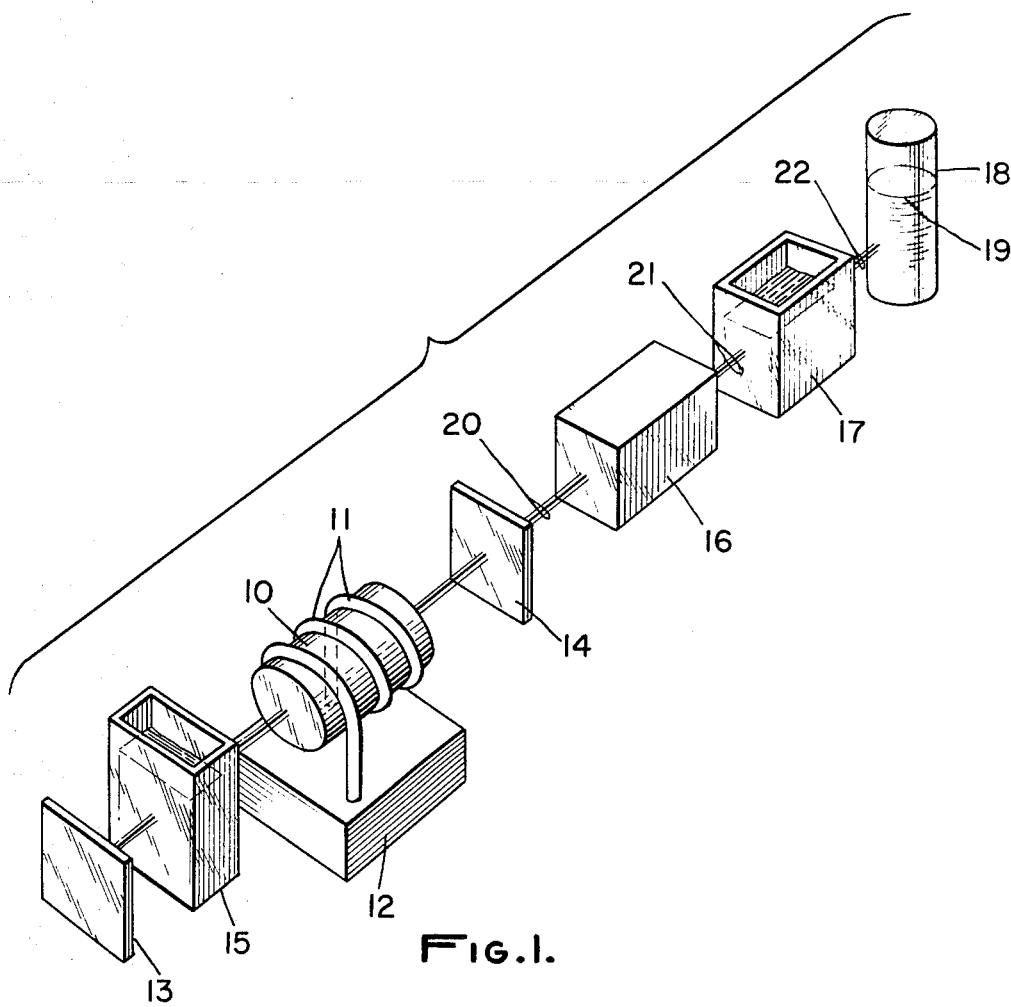
FIGURE 1 is a perspective view illustrating the various components making up the apparatus of this invention.

Referring to FIGURE 1, there is shown a laser crystal rod 10 which may comprise a ruby surrounded by a helical flash lamp 11 powered from a suitable light source pump 12. End mirrors 13 and 14 are disposed at opposite ends of the ruby rod 10 to define an optical cavity for the generation of the stimulated emission of radiation. A passive Q-spoiler 15 is disposed between the end mirror 13 and the ruby rod 10 to inhibit depletion of the inverted population level of laser ions established in the ruby rod until a high level of inversion is built up in the rod. The action of initial radiation within the optical cavity on the Q-spoiler 15 results in a changing of the Q-spoiler from an opaque to a substantially transparent condition so that greatly accelerated stimulated emission takes place to generate giant laser light pulses.

The foregoing laser system, which is chosen merely by way of example, is fully described in co-pending patent application Ser. No. 364,169, filed May 1, 1964, and entitled Light Control Means For Use With a Giant Pulse Laser.

The generated laser beam passes along a given path which includes a non-linear dielectric such as a potassium dihydrogen phosphate (KDP) crystal which functions as a frequency doubler. Thus, the crystal itself receives the incoming laser light and provides a doubled frequency output radiation or output beam of modified wave length.

Any output radiation from the frequency doubler 16 having a wave length corresponding to the original laser light is removed by a suitable filtering means in the form of a copper sulfate solution 17 disposed in the beam path. The output beam of modified radiation passes through a container 18 to irradiate a chemical solution 19 in which photosynthesis is to take place.

In the particular example under consideration, the ruby laser rod 10 provides an output beam from the end mirror 14 indicated at 20 of a given wave length of 6943 A. The output beam beam 21 from the KDP crystal 16 has a wave length of 3472 A. which is in the ultraviolet range. The copper sulfate solution has large absorption characteristics for red light or for radiation of the original laser radiation of 6943 A., but is substantially transparent to wave lengths of 3472 A. and thus serves as a filter so that the chemical solution 19 contained within the container 18 is essentially irradiated only with the ultraviolet beam 22.

Figure 2:
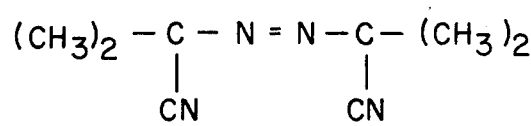
FIGURE 2 is a symbolic representation of a polymerization initiator useful in explaining the method as applied to a particular example of photosynthesis of a particular chemical.

In the particular example chosen for illustrative purposes, the chemical 19 constitutes the photo-sensitive chemical 2-azo-bis-isobutyronitrile in combination with vinyl acetate. The 2-azo-bis-isobutyronitrile comprising the polymerization initiator is illustrated symbolically in FIGURE 2. This substance has a high absorption peak near 3500 A. with an absorption cross-section of approximately $5 \times 10^{-20}$ cm.$^2$.

When the monomer solution 19 within the container 18 is irradiated with the 3472 A. beam 22, the absorption results in the splitting off of $N_2$ and the formation of two free radicals.

Figure 3:
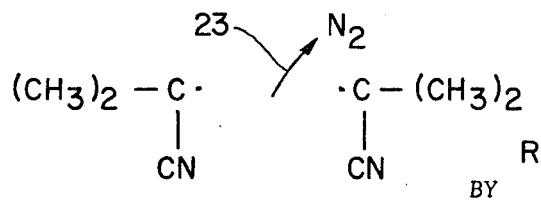
FIGURE 3 illustrates two free radicals derived from the initiator of FIGURE 2 upon photo-dissociation in accordance with the present invention.

FIGURE 3 illustrates the foregoing schematically wherein there are illustrated two free radicals with the release of nitrogen as indicated by the arrow 23. The radicals as illustrated in FIGURE 3 will each initiate a polymer chain to effect the desired polymerization.

The peak power per pulse from the laser system illustrated in FIGURE 1 of 6943 A. was 50 megawatts, each giant pulse having a duration of approximately $25 \times 10^{-9}$ seconds. Five giant pulses were generated for each flash of the spiral flash lamp 11 separated by approximately 50 microseconds. The total energy incident on the sample was approximately .06 joule and it was found for the particular sample under consideration that complete polymerization or solidification occurred after about 30 shots.

Assuming a minimum energy per pulse of coherent ultraviolet light provided at the beam portion 22 in FIGURE 1 of .01 joule (approximately $2 \times 10^{16}$ photons), it would be expected that approximately $2 \times 10^{16} \times 350 \times 0.6$ or approximately $4 \times 10^{18}$ molecules of monomer solution per pulse would be consumed provided that approximately .6 of the 3472 A. ultraviolet light was absorbed. This is on the order of 1 mm.$^3$ of vinyl acetate and thus is an easily observable effect. It was noted that the radical concentration produced per pulse by a 1 cm.$^2$ unfocussed beam in a 1 cm. path length was of the order of $10^{16}$ cm.$^{-3}$ which is about three or four orders higher than radical concentrations capable of being generated by prior art photo or thermal induced radical reactions.

In the actual experiment carried out, the vinyl acetate monomer was distilled to remove any inhibitor, the sensitizer was added, and the solution outgassed to remove oxygen. The laser irradiation as described in FIGURE 1 was carried out in a vacuum. With the use of five giant laser pulses generated per flash lamp firing separated by approximately 50 microseconds as described, the monomer sample had noticeable viscosity after only a few shots and the evolution of nitrogen was evident.

The energy outputs described above are quite modest compared to what can be obtainable from large laser devices. It will be evident, accordingly, that the method and apparatus of this invention will readily enable the formation of very high concentrations of free radicals in very short times and thus simultaneously effect initiation of large numbers of polymer chains.

In addition, the directivity characteristic of the laser beam permits great distances to exist between the reaction site and the initiating laser system without any appreciable loss of effectiveness.

The coherent nature of the beam and its directivity permits focussing and thus concentration of energy at extremely localized points in space. Accordingly, the point of initiation of a reaction may be accurately controlled. As one specific example, the doubled laser frequency beam could be focussed upon the surface of a piece of polymer (for example, polyethylene) which is immersed in a monomer (for example, styrene). Free radicals would be formed on the surface of the polyethylene which would initiate polymerization of the styrene resulting in a plastic composed of polyethylene and polystyrene "bonded" to it.

From the foregoing description, it will be clear accordingly that the method and apparatus of this invention have enabled the various objects set forth heretofore to be fully realized.

While only one specific example has been set forth, various modifications and changes in the method steps as well as in the apparatus itself which fall within the scope and spirit of the invention will occur to those skilled in the art. The method and apparatus for inducing chemical reactions are therefore not to be thought of as limited to the one example set forth merely for illustrative purposes.

What is claimed is:

1. A method of inducing chemical reaction in a monomer solution capable of reacting with free radicals and having a high absorption cross section for radiation of a given wave length by photodissociation, comprising the steps of: generating a series of high power pulses, each made up of a coherent beam of radiation of wave length having a peak power greater than five megawatts and a pulse duration greater than five nanoseconds by means of a giant pulse laser system; passing said pulses through a non-linear dielectric medium to provide pulses of coherent radiation of a modified wave length corresponding to said given wave length for which said monomer solution has a high absorption cross section; and directing and focusing said output pulses on said monomer solution to produce directly by photodissociation a large number of free radicals substantially simultaneously and thereby initiate polymerization of said monomer solution.

2. The method of claim 1, including the step of filtering from said output pulses any radiation of said first-mentioned wave length so that substantially only radiation of said modified wave length irradiates said solution.

References Cited

Dulberger et al.: Lasers; Electronics, vol. 34, No. 47.

D'Haenens et al.: Lasers and Their Applications, Journal of the SMPTE, vol 71.

Reichsteiner et al.: Masers and Lasers: A New Market with Enormous Growth Potential.

MURRAY TILLMAN, *Primary Examiner.*

R. TURER, *Assistant Examiner.*